WILLIAM KIMBALL.
Improvement in Railroad-Car Brakes.
No. 127,979. Patented June 18, 1872.
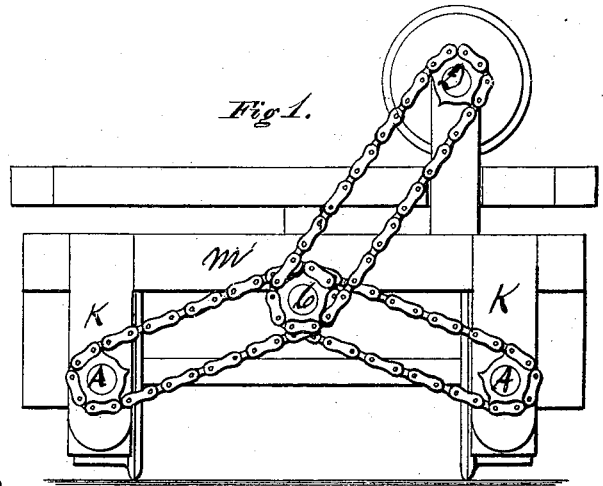
Fig 1.
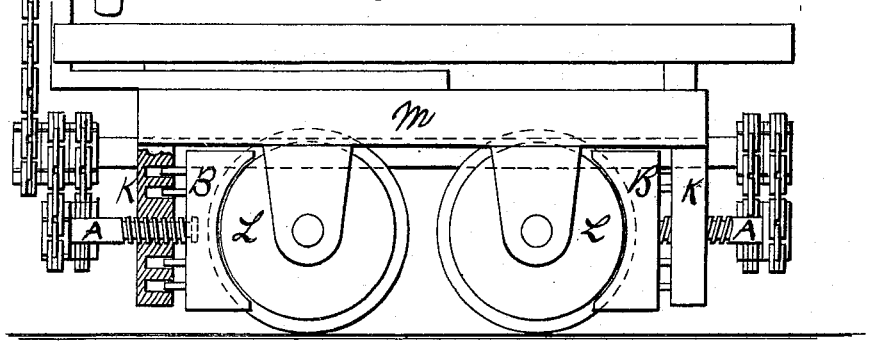
Fig 2.
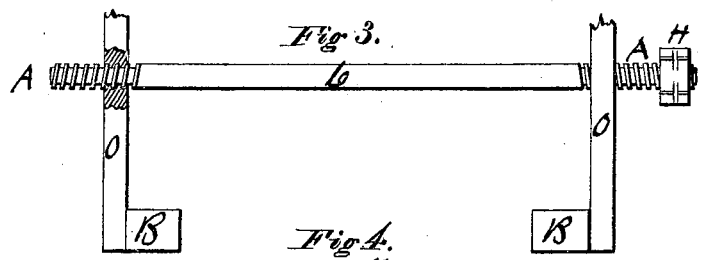
Fig 3.
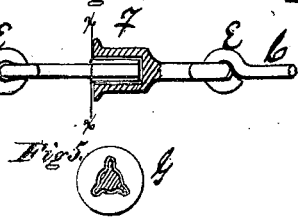
Fig 4.
Fig 5.
Witnesses. Inventor.

UNITED STATES PATENT OFFICE.

WILLIAM KIMBALL, OF WOBURN, MASSACHUSETTS.

IMPROVEMENT IN CAR-BRAKES.

Specification forming part of Letters Patent No. 127,979, dated June 18, 1872.

SPECIFICATION.

I, WILLIAM KIMBALL, of Woburn, in the county of Middlesex and State of Massachusetts, have invented certain Improvements in Railroad Car-Brakes, of which the following is a specification:

*Nature and Object of the Invention.*

The first part of my invention relates to the combination of a screw or screws with a brake or brakes, in such a manner that immense pressure is brought to bear directly on the wheels of the car, and thus checking its speed instantly.

*Description of the Accompanying Drawing.*

Figure 1 is an end view. Fig. 2 is a side view of one pair of trucks. Fig. 3 shows the screw applied to the cross-bar connecting the brakes. Fig. 4 shows the method of connecting the brakes of one car with those of another. Fig. 5 shows a transverse section of the socket connecting the brakes of different cars.

*General Description.*

A A are the screws, which, being connected to the wheel D, are turned and thus press the brakes B B with great force on to the wheels L L. The screws A A are applied directly to the brakes, as in Figs. 1 and 2, passing through K K, which are immovably fixed to the framework m of the trucks, and are cut with screw-threads; or, as in Fig. 3, by means of a shaft, C, with right and left screws passing through the bars O O connecting the brakes B B, this shaft when turned by the wheel D connected with wheel H, presses the brakes B B with great force upon the wheels L L. The shaft C, (in Figs. 1 and 3,) is continued from one set of trucks to another by an extension of the same, having between the trucks an eye-joint, E, or its equivalent, to enable the car to pass around curves without breaking the shaft, and to transmit the motion from the wheel D to the other brakes. F shows the method of connecting the shafts C C of two cars together. The end of one shaft is made with a grooved socket into which the other fits; this is to provide for the lost motion; and near the end of each shaft is an eye-joint, or its equivalent. This combination enables the motion given to wheel D to be continued to as many cars as are connected by the socket F. G shows an end view of the socket.

I claim as my invention—

The combination of the screws A A, blocks K K with the brakes B B, substantially as and for the purpose hereinbefore mentioned.

WM. KIMBALL.

Witnesses:
   WM. G. GREEN,
   W. B. MASON.